United States Patent
Francois et al.

(10) Patent No.: US 9,779,516 B2
(45) Date of Patent: Oct. 3, 2017

(54) METHOD AND DEVICE FOR PREDICTING AN IMAGE PORTION FOR ENCODING OR DECODING OF AN IMAGE

(71) Applicant: CANON KABUSHIKI KAISHA, Tokyo (JP)

(72) Inventors: Edouard Francois, Bourg des Comptes (FR); Guillaume Laroche, Melesse (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 505 days.

(21) Appl. No.: 13/939,507

(22) Filed: Jul. 11, 2013

(65) Prior Publication Data

US 2014/0016874 A1    Jan. 16, 2014

(30) Foreign Application Priority Data

Jul. 12, 2012   (GB) .................................. 1212423.6

(51) Int. Cl.
| | |
|---|---|
| H04N 7/12 | (2006.01) |
| H04N 11/02 | (2006.01) |
| H04N 11/04 | (2006.01) |
| G06T 9/00 | (2006.01) |
| H04N 19/176 | (2014.01) |
| H04N 19/61 | (2014.01) |
| H04N 19/593 | (2014.01) |
| H04N 19/11 | (2014.01) |
| H04N 19/154 | (2014.01) |

(52) U.S. Cl.
CPC ............. *G06T 9/004* (2013.01); *H04N 19/11* (2014.11); *H04N 19/154* (2014.11); *H04N 19/176* (2014.11); *H04N 19/593* (2014.11); *H04N 19/61* (2014.11)

(58) Field of Classification Search
CPC ........ G06T 9/004; H04N 19/61; H04N 19/11; H04N 19/176; H04N 19/593; H04N 19/154; H04N 19/105; H04N 19/159
See application file for complete search history.

(56) References Cited

U.S. PATENT DOCUMENTS

2009/0196342 A1    8/2009    Divorra Escoda et al.
2009/0268810 A1    10/2009   Dai
(Continued)

FOREIGN PATENT DOCUMENTS

KR    10-2011-0067539 A    6/2011
WO    2011/013253 A1    2/2011

Primary Examiner — Sath V Perungavoor
Assistant Examiner — Xiaolan Xu
(74) Attorney, Agent, or Firm — Canon U.S.A. Inc., IP Division

(57) ABSTRACT

A method of predicting a portion of an image, for encoding or decoding of an image, the image portion being predicted by an intra prediction process with respect to samples of at least one reference image portion of the image, the method comprising deriving samples from at least one reference image portion; generating, from said derived samples, by the intra prediction process, at least one prediction image portion corresponding to the image portion to be predicted; and applying a parametric displacement transformation to at least the derived samples and/or the prediction image portion. A method and device for encoding and a method a device for decoding are also described.

9 Claims, 11 Drawing Sheets

(56) References Cited

U.S. PATENT DOCUMENTS

| | | | |
|---|---|---|---|
| 2010/0118940 A1* | 5/2010 | Yin | H04N 19/105 |
| | | | 375/240.12 |
| 2010/0246675 A1* | 9/2010 | Gharavi-Alkhansari | H04N 19/105 |
| | | | 375/240.13 |
| 2010/0278267 A1* | 11/2010 | Lai | H04N 19/105 |
| | | | 375/240.16 |
| 2012/0294357 A1* | 11/2012 | Lainema | H04N 19/159 |
| | | | 375/240.12 |
| 2015/0296193 A1* | 10/2015 | Cote | H04N 9/646 |
| | | | 382/167 |

* cited by examiner

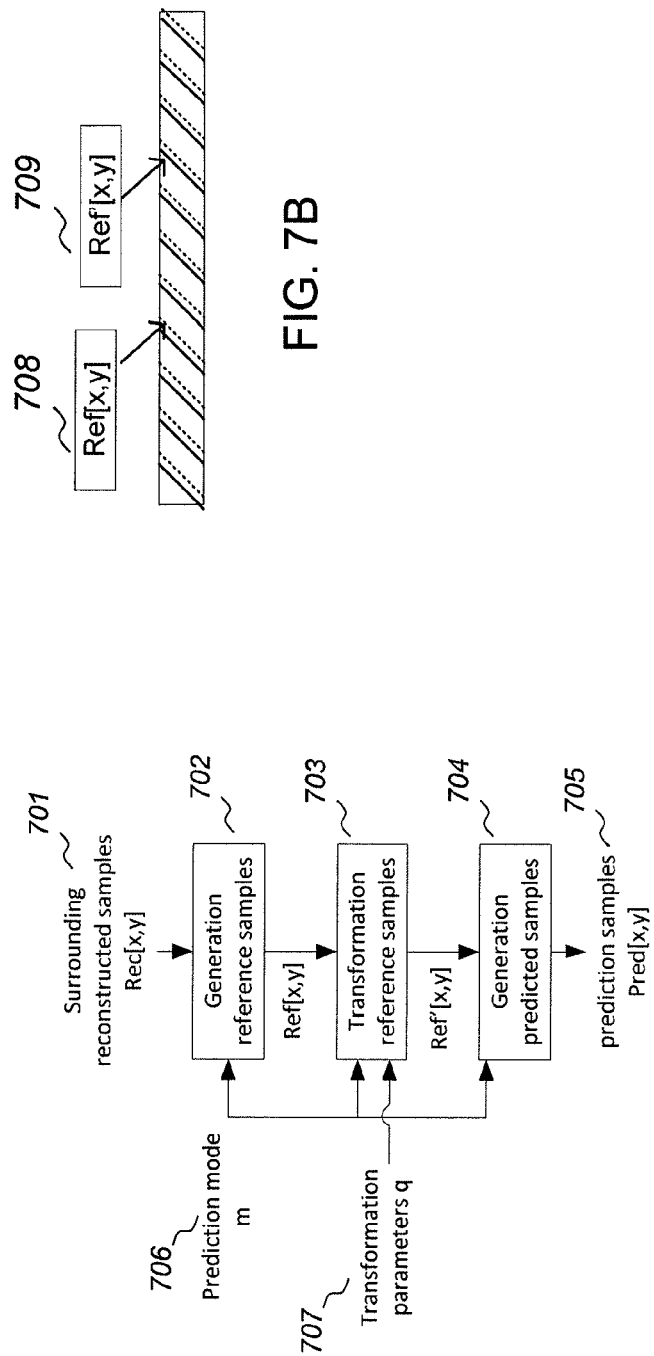

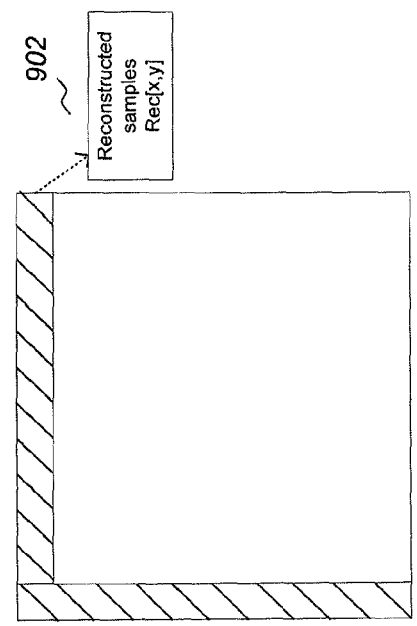
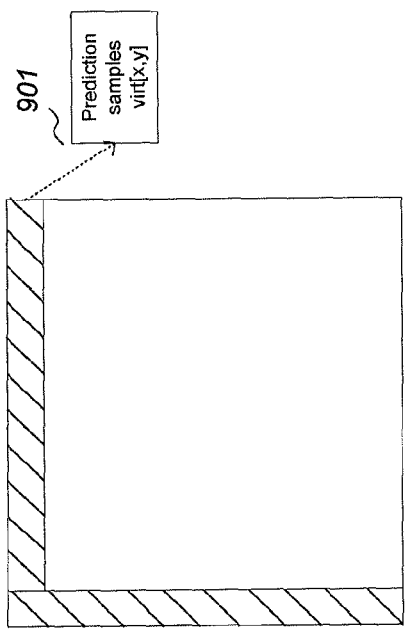
FIG. 9

METHOD AND DEVICE FOR PREDICTING AN IMAGE PORTION FOR ENCODING OR DECODING OF AN IMAGE

This application claims the benefit under 35 U.S.C. §119 (a)-(d) of United Kingdom Patent Application No. 1212423.6, filed on Jul. 12, 2012 and entitled "METHOD AND DEVICE FOR PREDICTING AN IMAGE PORTION FOR ENCODING OR DECODING OF AN IMAGE". The above cited patent application is incorporated herein by reference in its entirety.

FIELD OF THE INVENTION

The invention relates to a method and a device for predicting an image portion for encoding or decoding of an image. The invention further relates to a method and a device for encoding or decoding an image portion. Particularly, but not exclusively the invention relates more specifically to intra mode coding in the High Efficiency Video Coding (HEVC) standard under development.

DESCRIPTION OF THE PRIOR-ART

Video applications are continuously moving towards higher resolution. A large quantity of video material is distributed in digital form over broadcast channels, digital networks and packaged media, with a continuous evolution towards higher quality and resolution (e.g. higher number of pixels per frame, higher frame rate, higher bit-depth or extended color gamut). This technology evolution puts higher pressure on the distribution networks that are already facing difficulties in bringing HDTV resolution and high data rates economically to the end user. Consequently, any further data rate increases will put additional pressure on the networks. To handle this challenge, ITU-T and ISO/MP a new video coding standard project, called High Efficiency Video Coding (HEVC) was launched.

The HEVC codec design is similar to that of previous so-called block-based hybrid transform codecs such as H.263, H.264, MPEG-1, MPEG-2, MPEG-4, SVC. Video compression algorithms such as those standardized by standardization bodies ITU, ISO and SMPTE use the spatial and temporal redundancies of the images in order to generate data bit streams of reduced size compared with the video sequences. Such compression techniques render the transmission and/or storage of the video sequences more effective.

FIG. 1 shows an example of an image coding structure used in HEVC. A video sequence is made up of a sequence of digital images 101 represented by one or more matrices the coefficients of which represent pixels.

An image 101 is made up of one or more slices 102. A slice may be part of the image or, in some cases, the entire image. Slices are divided into non-overlapping blocks, typically referred to as Largest Coding Units (LCUs) 103; LCUs are generally blocks of size 64 pixels×64 pixels. Each LCU may in turn be iteratively divided into smaller variable size Coding Units (CUs) 104 using a quadtree decomposition.

During video compression in HEVC, each block of an image being processed is predicted spatially by an "Intra" predictor (so-called "Intra" coding mode), or temporally by an "Inter" predictor (so-called "Inter" coding mode). In intra coding mode the predictor (Intra predictor) used for the current block being coded is a block of pixels constructed from information already encoded or decoded (depending on whether the prediction process is applied at the encoder end or the decoder end) of the current image. By virtue of the identification of the predictor block and the coding of the residual, it is possible to reduce the quantity of information to be encoded.

A CU may thus be coded according to an intra coding mode, (samples of the CU are spatially predicted from neighboring samples of the CU) or to an inter coding mode (samples of the CU are temporally predicted from samples of previously coded slices).

Once the CU samples have been predicted, the residual signal between the original CU samples and the prediction CU samples is generated. This residual is then coded after having applied transformation and quantization processes.

In the current HEVC design, as well as in previous designs such as MPEG-4 AVC/H.264, intra coding involves deriving an intra prediction block from reconstructed neighboring samples 201 of the block to be encoded or decoded (depending on whether the prediction process is applied at the encoder end or at the decoder end), as illustrated schematically in FIG. 2A. Referring to the example of FIG. 2B, when coding a current CU 202, intra mode coding makes use of two neighbouring CUs that have already been coded or decoded, namely the Top and Left CUs 203 and 204.

In intra mode coding multiple prediction modes are supported. When a CU is intra coded, its related intra prediction mode is coded in order to inform a decoder how to decode the coded CU.

In HEVC, two types of intra prediction modes are supported. A first type corresponds to non-directional intra prediction modes and contains two modes: a Planar mode and a DC mode. A second type corresponds to directional intra prediction modes. Up to 33 directional modes are supported. FIG. 3 depicts the number of different considered modes in a recent design.

In a DC mode, samples inside the predicted block are equal to the mean of the neighboring samples. In a Planar mode, neighboring samples values are smoothly propagated inside the prediction block, using a linear variation.

In directional modes, the neighboring samples values are propagated along a given angular direction. The prediction process operates in two steps. First a row of reference samples refMain[p] (p being the position in the refMain table) is built from the neighbouring samples and the angular direction. Then these reference samples are used to predict the samples inside the block pred[x,y] (x,y being the coordinates in the block) along the angular direction.

The refMain row is either horizontal or vertical depending on the direction. When the direction is below the diagonal left direction (numbered as 18 in FIG. 3), the refMain row is vertical. Otherwise the refMain row is horizontal. For instance in FIG. 4, when the direction 402 is below the diagonal left direction 401, the reference samples refMain[p] 403) are built from the top row of the block and from the left column of the block projected along the horizontal axis. The horizontal refMain[p] table is then used to derive the block prediction pred[x,y] 404. When the direction 405 is above the diagonal left direction 406, the reference samples remain[p] 407 are built from the left column of the block and from the top row of the block projected along the vertical axis. The vertical refMain[p] table is then used to derive the block prediction pred[x,y] 408.

In the following, only the case of horizontal refMain row is considered. The symmetric case of vertical refMain column can be easily deduced. If (x,y) is a pixel of the block. The prediction value at (x,y) is derived as:

$$\text{Pred}[x,y] = \text{refMain}[y \cdot \theta + x] \quad (1)$$

where θ is the arc tangent of the angle corresponding to the angular direction, as shown in FIG. 5.

In its practical numerical HEVC implementation, the following equation applies:

$$\text{Pred}[x,y] = ((32-i\text{Fact})*\text{ref}[idx] + i\text{Fact}*\text{ref}[idx+1] + 16) >> 5 \quad (2)$$

where idx and iFact are the integer and fractional parts of (y·θ+x), as shown in FIG. 5. This process enables the reference samples signal to be interpolated with an accuracy of 1/32 pixel.

The present invention has been devised to provide an improved intra prediction process. In particular, embodiments of the invention seek to address a loss in coding efficiency induced by spatial misalignment of reference samples.

SUMMARY OF THE INVENTION

According to a first aspect of the invention there is provided a method of predicting a portion of an image, for encoding or decoding of an image, the image portion being predicted by an intra prediction process with respect to samples of at least one reference image portion of the image, the method comprising:

deriving samples from at least one reference image portion;

generating, from said derived samples, by the intra prediction process, at least one prediction image portion corresponding to the image portion to be predicted; and applying a parametric displacement transformation to at least the derived samples and/or the prediction image portion By applying the method of embodiments of the invention potential slight misalignments of the reference samples may be corrected. In the case of an image portion block containing strong structures (with strong edges) for example, correction of a slight misalignment of the prediction signal will result in improved coding efficiency since the energy of the prediction signal may be reduced by the misalignment correction.

In an embodiment, the parametric displacement transformation is applied to the derived samples prior to generation of the prediction image portion.

In an embodiment, the intra prediction process is adapted according to the parametric displacement transformation.

In an embodiment, the parametric displacement transformation is applied to the generated prediction image portion.

In an embodiment, the direction of the parametric displacement transformation is determined from the intra prediction mode.

In an embodiment, the type of parametric displacement transformation is dependent upon the intra prediction mode.

In an embodiment, parameters of the parametric displacement transformation are determined from data of one or more encoded image portions neighbouring the image portion to be encoded.

In an embodiment, the parametric displacement transformation comprises a 1D displacement defined by one parameter.

In an embodiment, the parametric displacement transformation comprises a 2D displacement defined by two parameters In an embodiment, the parametric displacement transformation comprises an affine displacement.

In an embodiment, data representative of the parametric displacement transformation is signalled in the bitstream into which the image portion is encoded.

In an embodiment, the or each derived sample is derived from encoded neighbouring image portions of the image portion to be predicted.

According to a second aspect of the invention there is provided a method of encoding an image, comprising predicting a portion of an image by an intra prediction process with respect to samples of at least one reference image portion of the image, in accordance with any embodiment of the first aspect of the invention;

encoding image data obtained based on the at least one prediction image portion.

According to a third aspect of the invention there is provided a method of decoding an image, comprising predicting a portion of an image by an intra prediction process with respect to samples of at least one reference image portion of the image, in accordance with the method of any embodiment of the first aspect of the invention;

decoding image data obtained based on the at least one prediction image portion.

According to a fourth aspect of the invention there is provided a device for predicting a portion of an image, for encoding or decoding of an image, the image portion being predicted by an intra prediction process with respect to samples of at least one reference image portion of the image, the device comprising:

derivation means for deriving samples from at least one reference image portion;

generation means for generating, from said derived samples, by the intra prediction process, at least one prediction image portion corresponding to the image portion to be predicted; and transformation means for applying a parametric displacement transformation to at least the derived samples and/or the prediction image portion.

In an embodiment, the transformation means is operable to apply a parametric displacement transformation to the derived samples prior to generation of the prediction image portion.

In an embodiment, the generation means is operable to adapt the intra prediction process according to the parametric displacement transformation.

In an embodiment, the transformation means is adapted to apply the parametric displacement transformation to the generated prediction image portion.

In an embodiment, the transformation means is operable to determine the direction of the parametric displacement transformation from the intra prediction mode.

In an embodiment, the transformation means is operable to determine the type of parametric displacement transformation based on the intra prediction mode.

In an embodiment, the transformation means is operable to determine the parameters of the parametric displacement transformation from data of one or more encoded image portions neighbouring the image portion to be encoded.

In an embodiment, the transformation means is operable to apply a 1D displacement defined by one parameter.

In an embodiment, the transformation means is operable to apply a 2D displacement defined by two parameters In an embodiment, the transformation means is operable to apply an affine displacement.

In an embodiment, signalling means are provided for signalling data representative of the parametric displacement transformation in the bitstream into which the image portion is encoded.

In an embodiment, the derivation means is operable to derive each derived sample from encoded neighbouring image portions of the image portion to be predicted.

According to a fifth aspect of the invention there is provided an encoding device for encoding an image, comprising a device for predicting a portion of an image by an intra prediction process with respect to samples of at least one reference image portion of the image;

an encoder for encoding image data obtained based on the at least one prediction image portion.

According to a sixth aspect of the invention there is provided a decoding device for decoding an image, comprising a device for predicting a portion of an image by an intra prediction process with respect to samples of at least one reference image portion of the image;

a decoder for decoding image data obtained based on the at least one prediction image portion.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIGS. 7A and 7B illustrate a method of predicting an image portion according to a second embodiment of the invention.

FIG. 9 schematically illustrates the samples that are used to infer the transformation parameters at the encoder and decoder end according to one or more embodiments of the invention.

DETAILED DESCRIPTION OF EMBODIMENTS OF THE INVENTION

The description of embodiments of the invention will focus on embodiments of a prediction process that are common to the encoder and the decoder. The prediction process of the described embodiments may indeed implemented in the same way at both the encoder and decoder ends.

Three options are considered:
1. Modification of a prediction block
2. Modification of reference samples
3. Modification of a prediction process A method of predicting a portion of an image for encoding or decoding of an image according to a first embodiment of the invention will now be described with reference to FIGS. 6A to 6C.

Figure 1:
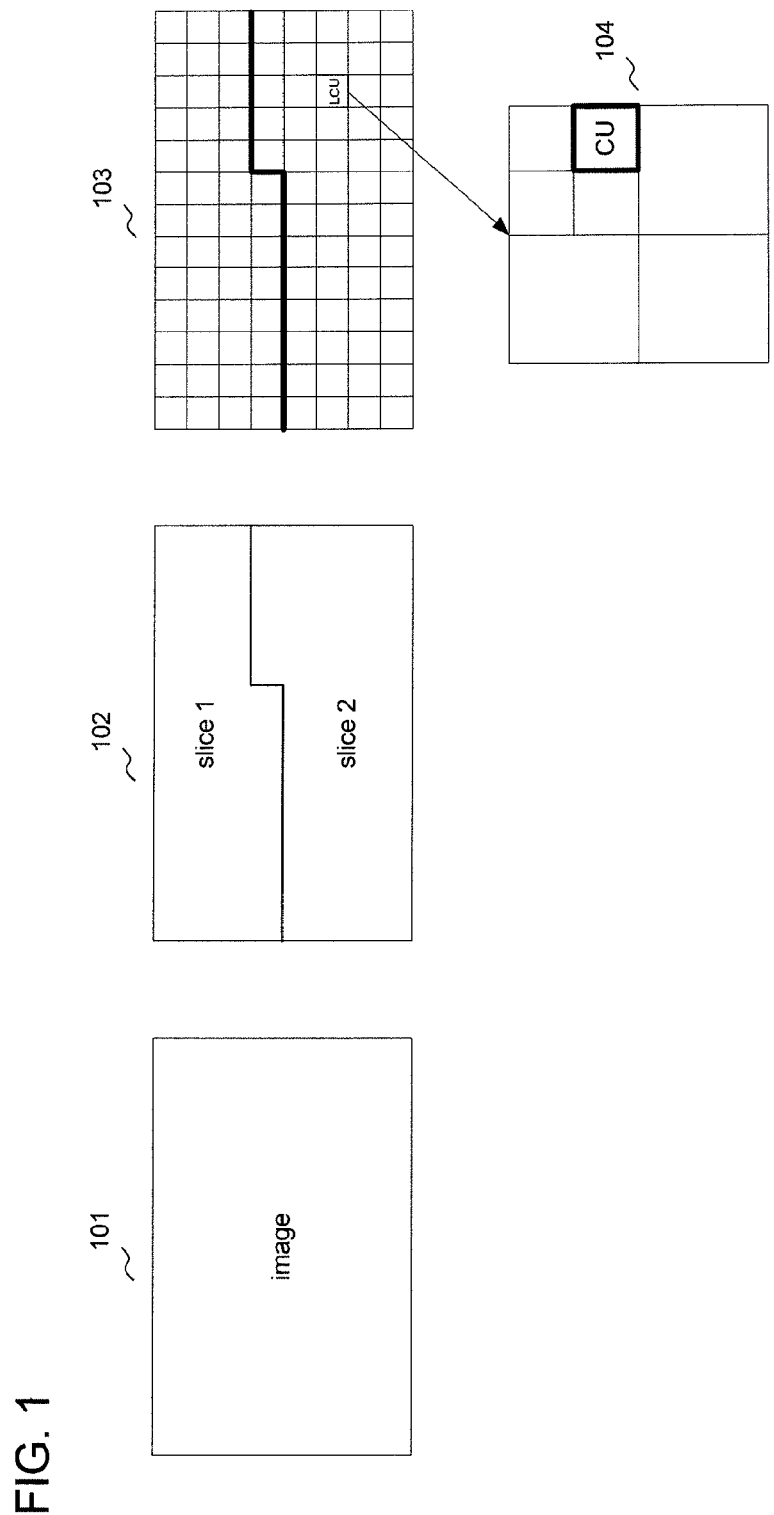
FIG. 1 illustrates an example of image coding structure as defined in the HEVC specification.
Figure 2:
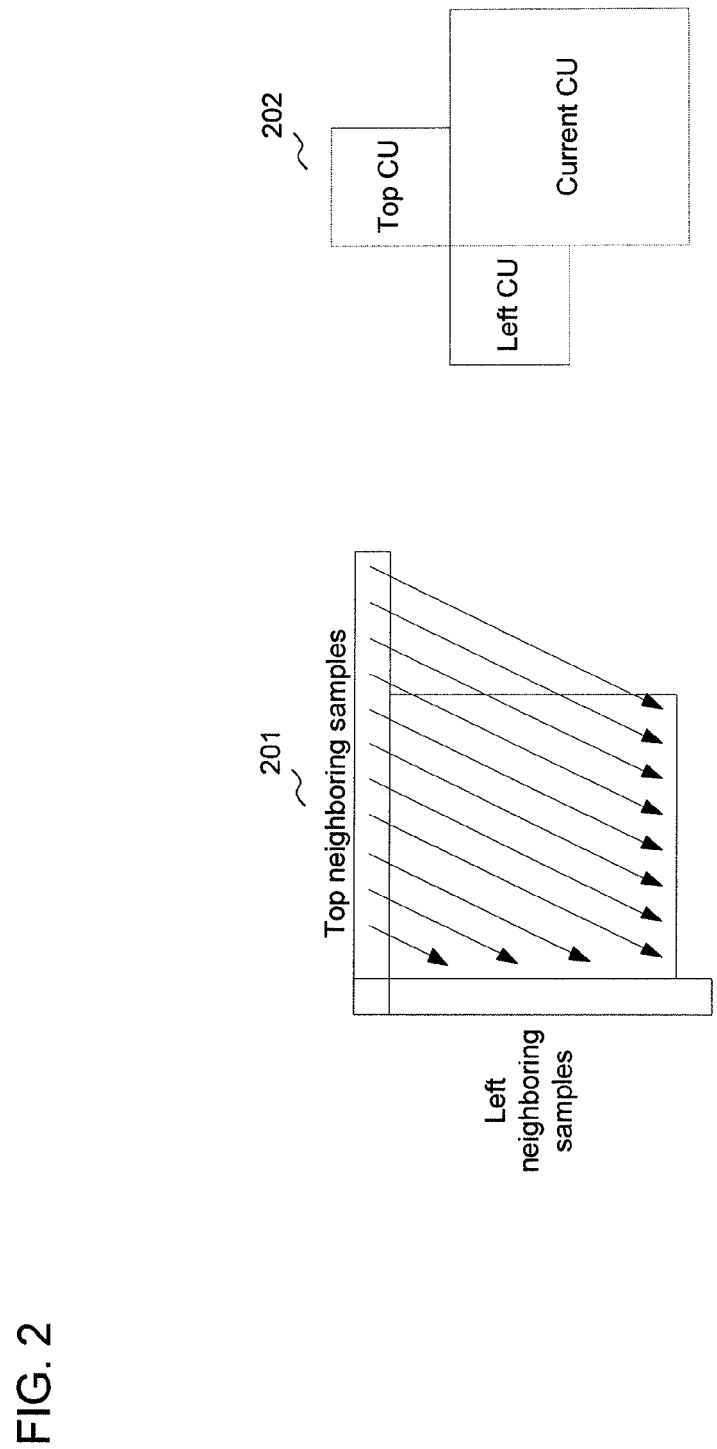
FIG. 2 schematically illustrates image portions of image in an intra prediction coding process.
Figure 3:
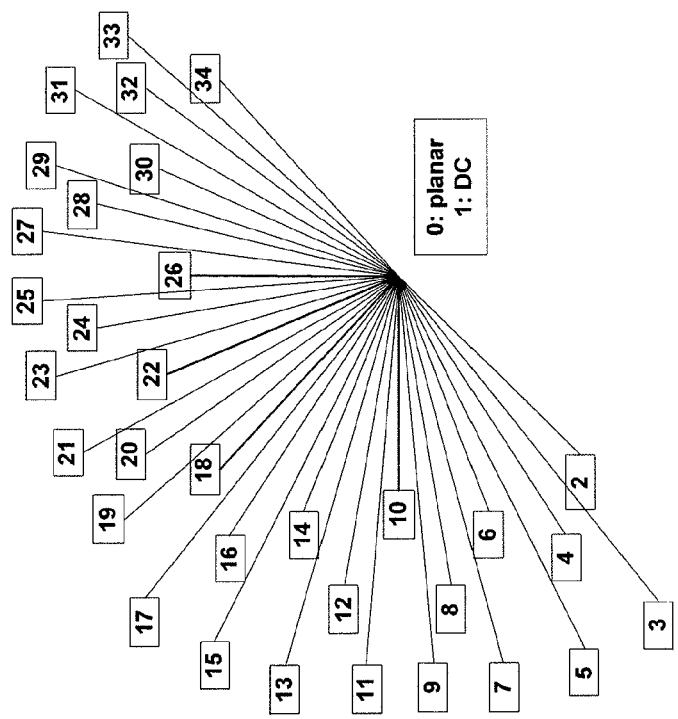
FIG. 3 shows various prediction modes considered in HEVC with their corresponding mode numbers.
Figure 4:
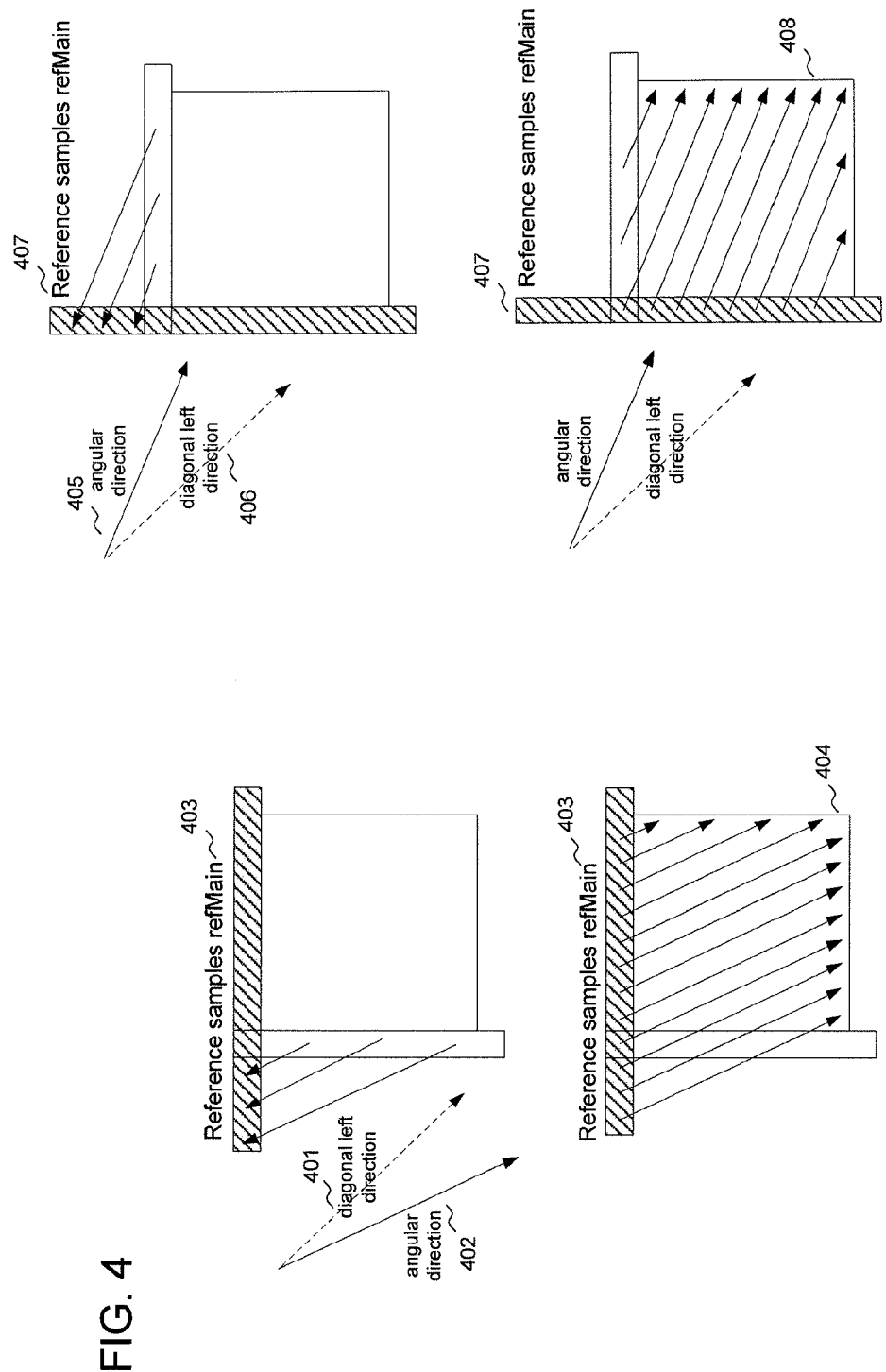
FIG. 4 schematically illustrates example for building an array of reference samples HEVC.
Figure 5:
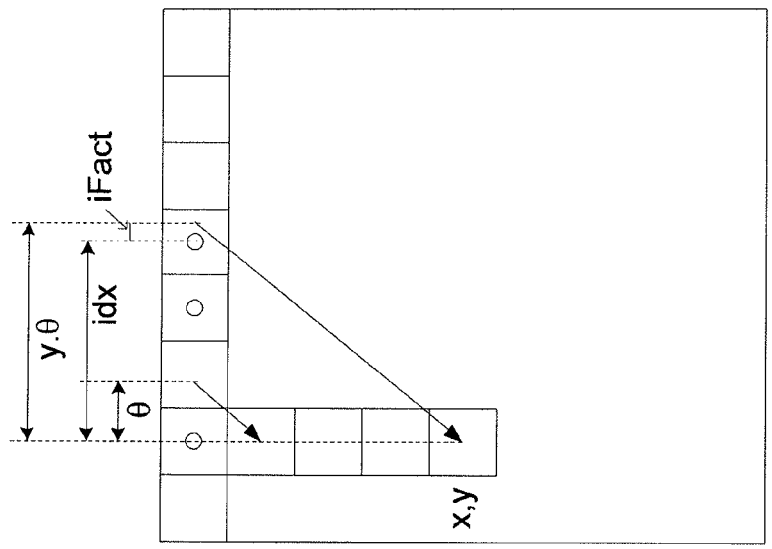
FIG. 5 schematically illustrates a process of angular prediction in HEVC.
Figure 6B:
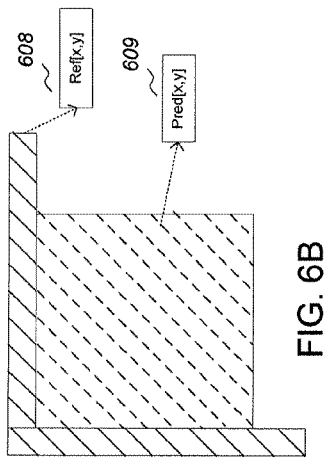
FIGS. 6A to 6C illustrate a method of predicting an image portion according to a first embodiment of the invention.
Figure 6C:
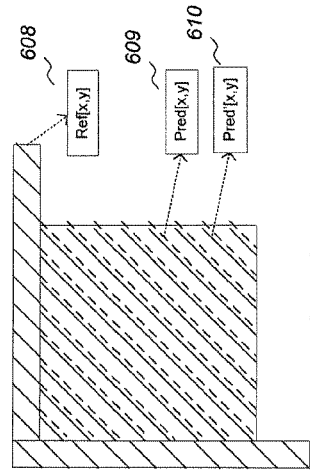
Figure 6A:
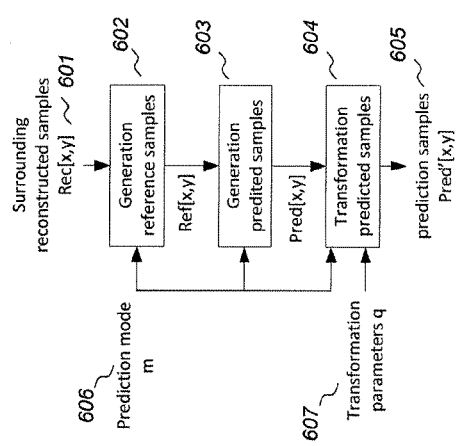

FIG. 6A is a flow chart illustrating steps of a method of predicting an image portion according to a first embodiment of the invention. In what follows an image portion is referred to as a block. The input data of the prediction process include reconstructed samples 601 Rec[x,y] surrounding a block of an image to be predicted and the intra prediction mode m 606. A reference samples generation process is applied in step S602 to build reference samples Ref[x,y] from the surrounding samples Rec[x,y] 601 by applying the intra prediction mode m 606. A process for generating predicted samples is then applied in step S603 to generate the predicted samples Pred[x,y] of the block from the reference samples Ref[x,y], using the intra prediction mode m 606. A final parametric transformation process is then applied in step S604 to the predicted samples Pred[x,y] to generate final prediction samples Pred'[x,y] 605. This transformation uses input transformation parameters q 607 and, when appropriate, the intra prediction mode m 606.

In a particular embodiment, the parametric transformation of step S604 corresponds to a 2D affine displacement potentially combined with a translation:

$$q = \left\{\begin{matrix} a & b \\ c & d \end{matrix}\right\}, \left\{\begin{matrix} e \\ f \end{matrix}\right\} \qquad (3)$$

and $$Pred'[x, y] = Pred[u, v] \qquad (4)$$

with $$\begin{cases} u = a \cdot x + b \cdot y + e \\ v = c \cdot x + d \cdot y + f \end{cases} \qquad (5)$$

Since u and v are not necessarily at integer positions, an interpolation process is applied to generate Pred[u,v]. A bilinear interpolation process can be used, for example. Another possibility is to use the same interpolation filter used in the motion compensation process of HEVC (8-tap linear filter for luma samples, 4-tap linear filter for chroma samples).

In one embodiment, the transformation of step S604 corresponds to a 2D translation specified by 2 parameters q=(e,f). This corresponds to the affine case, with a=b=c=d=0.

In another embodiment, the affine part of the transformation can be constrained to be only an homothetic transformation, with parameters a=d, and c=b=0, or only a rotation, with parameters a=d=r·cos(theta), b=−c=r·sin(theta), r and theta being alternate parameters to parameters a,b,c,d, or a combination of rotation and homothetic transformation.

In another embodiment, the transformation of step S604 corresponds to a 1D translation specified by one parameter. The direction of the displacement can be deduced from the intra prediction mode. For instance, if the intra prediction mode is angular, and applies to a horizontal refMain row of samples, the displacement is applied in the horizontal dimension. Inversely, if the intra prediction mode is angular, and applies to a vertical refMain row of samples, the displacement is applied in the vertical dimension.

In one particular embodiment, the type of transformation of step S604 depends on the intra mode. For instance, if the mode is non-angular, a 2D displacement applies. If the mode is angular, a 1D displacement applies.

FIGS. 6B and 6C schematically illustrate an example of this process. In the illustrated example, the block being predicted as well as the reference sample rows, contain samples corresponding to oriented lines. It is supposed that the intra prediction mode corresponds exactly to the angular direction of these oriented lines. First the prediction samples Pred[x,y] 609 of the block are generated from the reference samples Ref[x,y] 608 by directional propagation along the angular direction as illustrated in FIG. 6B. The displacement is applied to the predicted samples Pred[x,y] 609, to generate the final prediction samples Pred'[x,y] 610, that correspond to the oriented lines slightly displaced, as illustrated in FIG. 6C.

A method of predicting a portion of an image for encoding or decoding of image according to a second embodiment of the invention will now be described with reference to FIGS. 7A to 7B.

FIG. 7A is a flow chart illustrating steps of a method of predicting an image portion according to a second embodiment of the invention. The input data of the prediction process are reconstructed samples Rec[x,y] 701 surrounding the block of the image to be predicted and the intra prediction mode m 706. A process for generating reference samples is applied in step S702 to generate reference samples Ref[x,y] from the surrounding samples Rec[x,y] and using the intra prediction mode m 706. A transformation process is then applied in step S703 to the reference samples Ref[x,y] to generate a new version of reference samples Ref'[x,y]. The transformation uses input parameters q 707 and where appropriate the intra prediction mode m 706. Then in step S704 a process for generating the predicted samples is applied using the reference samples Ref'[x,y] and the intra prediction mode m 706 to generate the predicted samples of the block.

In one particular embodiment, the transformation of step S704 corresponds to a 2D affine displacement potentially combined with a translation:

$$q = \left\{\begin{matrix} a & b \\ c & d \end{matrix}\right\}, \left\{\begin{matrix} e \\ f \end{matrix}\right\} \quad (6)$$

and $$Ref'[x, y] = Ref[u, v] \quad (7)$$

With:

$$\begin{cases} u = a \cdot x + b \cdot y + e \\ v = c \cdot x + d \cdot y + f \end{cases} \quad (8)$$

As u and v are not necessarily at integer positions, an interpolation process is applied to generate reference samples Ref'[u,v]. A bilinear interpolation process can be used, for example. Another possibility is to use the same interpolation filter used in the motion compensation process of HEVC (8-tap linear filter for luma samples, 4-tap linear filter for chroma samples). In one embodiment, the transformation of step S704 corresponds to a 2D translation specified by 2 parameters q=(e,f). This corresponds to the affine case, with a=b=c=d=0.

In another embodiment, the affine part of the transformation can be constrained to be only an homothetic transformation, with parameters a=d, and c=b=0, or only a rotation, with parameters a=d=r·cos(theta), b=−c=r·sin(theta), r and theta being alternate parameters to parameters a,b,c,d, or a combination of rotation and homothetic transformation.

In another embodiment, the transformation of step S704 corresponds to a 1D translation specified by 1 parameter. The direction of the displacement can be deduced from the intra prediction mode. For instance, if the intra prediction mode is angular, and applies to horizontal refMain row, the displacement applies in the horizontal dimension. Inversely, if the intra prediction mode is angular, and applies to vertical refMain row, the displacement applies in the vertical dimension. The direction of the displacement can also be signaled in the bitstream. If the reference samples are stored in a 1D array (refMain[x]), the displacement is necessarily 1D and no direction needs to be signaled.

In one particular embodiment, the type of transformation of step S704 depends on the intra mode. For instance, if the mode is non-angular, a 2D displacement applies. If the mode is angular, a 1D displacement applies.

FIG. 7B schematically illustrates an example of this process. In this example, the reference samples are a 1D row, the value of these samples corresponding to oriented lines. The modified reference samples Ref'[x,y] 709 are obtained from reference samples Ref[x,y] 708 after having applied the transformation (1D displacement).

Some particular embodiments of the invention can be implemented in the HEVC design directly by modifying the prediction process, in the case of a 1D displacement. As explained above, for angular prediction modes, the prediction process first generates a 1D row of reference samples refMain[x].

If a 1D displacement is applied, a simple process can be applied to generate the angular intra prediction samples without explicitly generating a new row of reference samples ref'[x] from the original row ref[x]. q is limited to one scalar parameter q={d}, which corresponds to the 1D displacement to be applied.

The prediction samples are generated as follows:

$$Pred[x,y]=((32-iFact)*ref[idx]+iFact*ref[idx+1]+16)>>5 \quad (9)$$

where idx and iFact are the integer and fractional parts of (y·θ+x+d). This is equivalent to displacing the reference samples by an offset value corresponding to a displacement of d, or to displace the predicted samples.

Nevertheless, this solution is advantageous in that it avoids generating a new row of reference samples ref'[x] from the original row of reference samples ref[x] and does not add any complexity since almost the same prediction equation is used as in the default HEVC design. An example of such a process is illustrated in FIG. 8.

Figure 8:
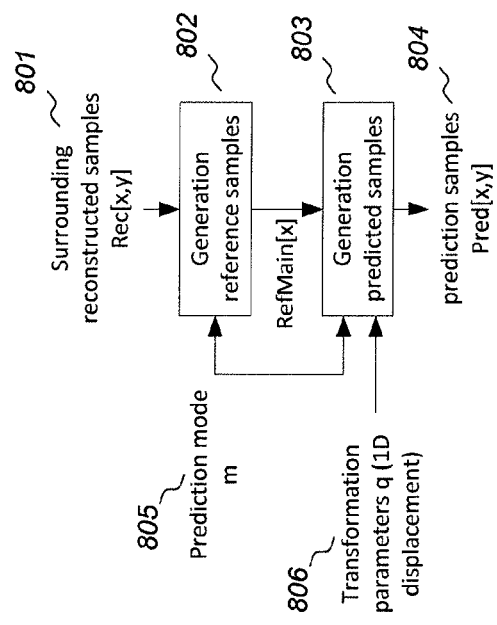
FIG. 8 illustrates a method of predicting an image portion according to a third embodiment of the invention.

FIG. 8 is a flow chart illustrating steps of a method of predicting an image portion according to a third embodiment of the invention. The input data of the prediction process are reconstructed samples Rec[x,y] 801 surrounding the block to be predicted and the intra prediction mode m 805. A process for generating samples generation is applied in step S802 to generate reference samples RefMain[x] from the surrounding samples 801 and using the intra prediction mode m 805. Then the modified generation process of predicted samples Pred[x,y] 804 is then applied in step S803 to generate predicted samples Pred[x,y] 804 using the reference samples RefMain[x]. This process also uses as input data the displacement d 806 and the intra prediction mode m 805.

In one particular embodiment, d is not constant over the entire block and may vary with the line (or column) number. For instance a linear model can be used: d(y)=d0+y·d1, which means that the parameters q is made of 2 parameters (d0,d1).

In one particular embodiment of the invention, input parameters q are identified at the encoder end and transmitted in the bitstream for each CU, and for a set of CUs (for example, for the largest coding units—LCU—specified in HEVC). The decoder explicitly decodes these data for each CU or set of CUs.

At the encoder end, the estimation process of q can comprise an exhaustive rate-distortion testing of all the possible values of q. For instance q is among $\{-1, 0, 1\}$ in the case of a 1D displacement. In the case of an affine transformation, q is made of 6 parameters and consequently the search set is 6-dimensional. The translational part (parameters e and f) can be checked similarly in the set $\{-1, 0, 1\}$. Regarding the affine part (parameters a, b, c and d), the set $\{-0.1, 0, 0.1\}$ can be used for each parameter, for instance. For each considered possible value of q, a prediction process is applied. The related distortion D(m,q) compared to the original signal is measured. In addition the coding cost R(m,q) of the prediction residual, and the coding parameters (coding mode m, parameters q) is computed. The best parameters configuration is the parameters q_opt such as D(m,q)+λ·R(m,q) is minimum. λ is the so-called lagrangian parameter, generally set at the encoder based on the quantization parameter value.

In another embodiment, the decoder is operable to infer the parameters q. No signaling is thus required. For instance, q is computed from the prediction samples of surrounding blocks and reconstructed samples. This is schematically illustrated in FIG. 9. Virtual prediction samples virt[x,y] are considered as the surrounding samples resulting from a spatial prediction applied to the surrounding blocks (using their own intra coding mode if they are intra coded, or using the mode m if they are not intra coded, or using the mode m whatever they are intra or inter coded). Similarly the surrounding reconstructed samples Rec[x,y] are considered. The displacement is estimated between these 2 samples sets, for instance by a classical matching algorithm. Of course, the encoder must perform the same process on its side, in order to generate the same parameters as the decoder.

A mix of these two approaches may also be considered. The encoder and decoder infer a probable value of q. Then the encoder performs the estimation of the true value of q, based on the real samples and using for instance a rate-distortion optimization among all the possible values of q. Finally the encoder transmits the difference q_diff between the estimated parameters q_est and the true parameters q_real. At the decoder side, the same parameters inferring process is first applied to identify q_est. The decoder decodes the difference q_diff. The final parameter to be applied is q_real=q_est+q_diff.

Figure 10:
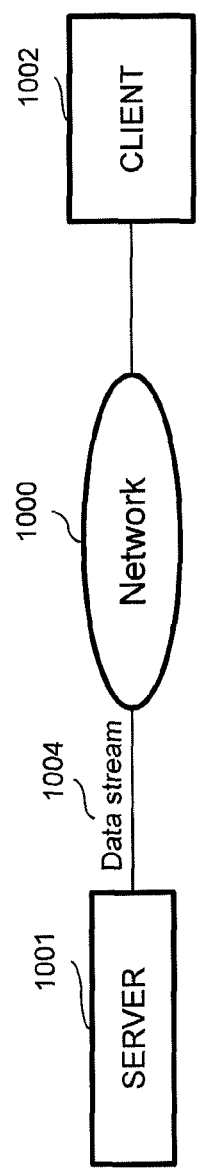
FIG. 10 is a schematic diagram of a wireless communication network in which one or more embodiments of the invention may be implemented.

FIG. 10 illustrates a data communication system in which one or more embodiments of the invention may be implemented. Although a streaming scenario is considered here, data communication can be performed using for example a media storage device such as an optical disc. The data communication system comprises a transmission device, in this case a server 1001, which is operable to transmit data packets of a data stream to a receiving device, in this case a client terminal 1002, via a data communication network 1000. The data communication network 1000 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 1001 sends the same data content to multiple clients.

The data stream 1004 provided by the server 1001 may be composed of a bitstream representing multimedia data such as video and/or audio data. Audio and video data streams may, in some embodiments of the invention, be captured by the server 1001 using a microphone and a camera respectively. In some embodiments data streams may be stored on the server 1001 or received by the server 1001 from another data provider, or generated at the server 1001. The server 1001 is provided with an encoder for encoding video and audio streams in particular to provide a compressed bitstream for transmission that is a more compact representation of the data input to the encoder.

In order to obtain a better ratio of the quality of transmitted data to quantity of transmitted data, the compression of video data may be for example in accordance with the HEVC format or H.264/AVC format.

The client 1002 receives the transmitted bitstream and decodes the reconstructed bitstream to reproduce video images on a display device and audio data by a loud speaker.

In one or more embodiments of the invention an encoded video image is transmitted with a brightness component (luma) and two colour components (chroma). The digital representation of the video signal thus includes a luma component (Y), representative of brightness, and colour difference (or chroma) components U and V.

It will be appreciated that while the detailed examples related to a YUV model the invention is not limited thereto, and may be applied to other models such as an RGB, or for encoding any image composed of several colour components, at least one colour component being considered as a reference colour component, the other colour components being dependently coded based on this reference colour component.

Figure 11:
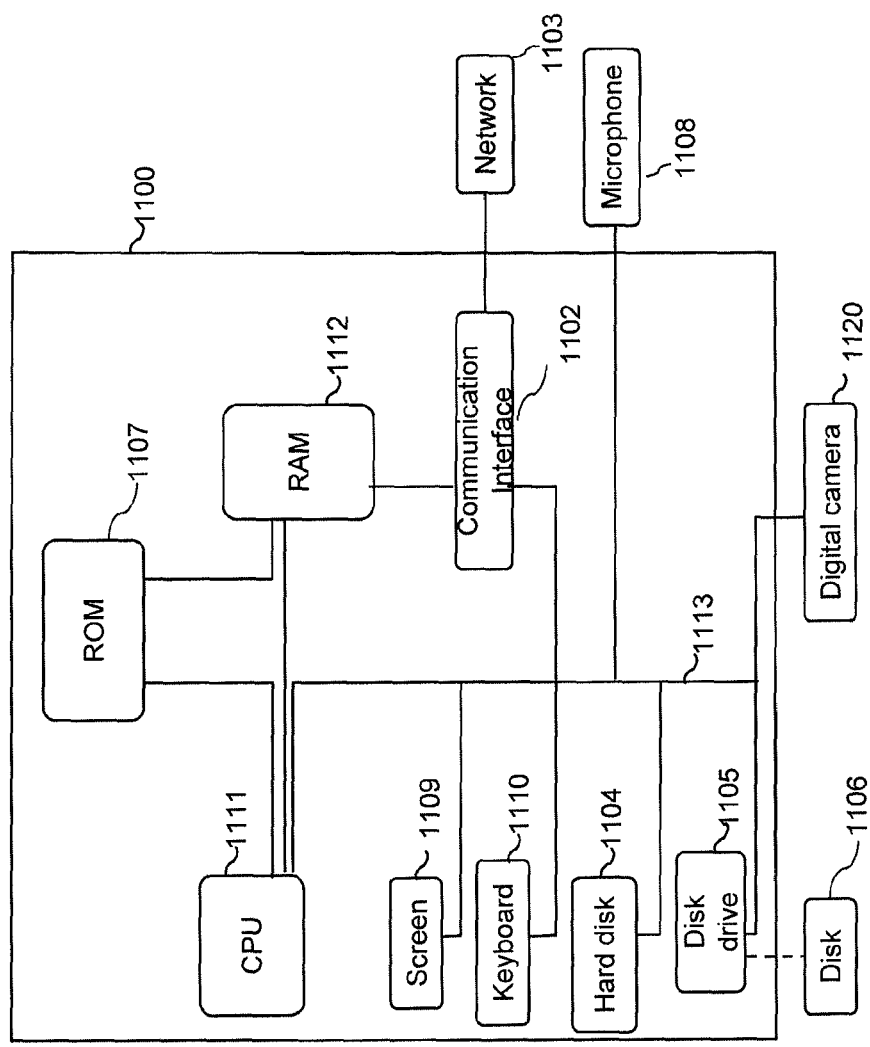
FIG. 11 is a schematic block diagram of a wireless communication device according to at least one embodiment of the invention.

FIG. 11 schematically illustrates a processing device 1100 configured to implement at least one embodiment of the present invention. The processing device 1100 may be a device such as a micro-computer, a workstation or a light portable device such as a smart phone and portable computer. The device 1100 comprises a communication bus 1113 connected to:

- a central processing unit 1111, such as a microprocessor, denoted CPU;
- a read only memory 1107, denoted ROM, for storing computer programs for implementing embodiments of the invention;
- a random access memory 1112, denoted RAM, which may be used for storing the executable code of the method of embodiments of the invention as well as the registers adapted to record variables and parameters necessary for implementing the method of encoding a sequence of digital images and/or the method of decoding a bitstream according to embodiments of the invention; and
- a communication interface 1102 connected to a communication network 11011 over which data to be processed is transmitted or received.

Optionally, the apparatus 1100 may also include the following components:

- a data storage means 1104 such as a hard disk, for storing computer programs for implementing methods of one or more embodiments of the invention and data used or produced during the implementation of one or more embodiments of the invention;
- a disk drive 1105 for a disk 1106, the disk drive being adapted to read data from the disk 1106 or to write data onto said disk;
- a screen 1109 for displaying data and/or serving as a graphical interface with the user, by means of a keyboard 1110 or any other pointing means.

The apparatus 1100 can be connected to various peripherals, such as for example a digital camera 1120 or a microphone 1108, each being connected to an input/output card (not shown) so as to supply multimedia data to the apparatus 1100.

The communication bus 1113 provides communication and interoperability between the various elements included in the apparatus 1100 or connected to it. The representation of the communication bus is not limiting and in particular the central processing unit is operable to communicate instructions to any element of the apparatus 1100 directly or by means of another element of the apparatus 1100.

The disk 1106 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 1107, on the hard disk 1104 or on a removable digital medium such as for example a disk 1106 as described previously. Moreover in some embodiments, the executable code of the programs can be received by means of the communication network 1103, via the interface 1102, in order to be stored in one of the storage means of the apparatus 1100 before being executed, such as the hard disk 1104.

The central processing unit 1111 is adapted to control and direct the execution of the instructions or portions of software code of the program or programs for running methods such as encoding or decoding according to embodiments of the invention, instructions that are stored in one of the aforementioned storage means. On powering up, the program or programs that are stored in a non-volatile memory, for example on the hard disk 1104 or in the read only memory 1107, are transferred into the random access memory 1112, which then contains the executable code of the program or programs, as well as registers for storing the variables and parameters necessary for implementing embodiments of the invention.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a skilled person in the art which lie within the scope of the present invention. Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of predicting of an image portion, for encoding or decoding the image, the image portion being predicted by an intra prediction process with respect to samples of at least one reference image portion of the image, the method comprising:
   generating reference samples from the samples surrounding the image portion to be predicted;
   generating, from the reference samples, by the intra prediction process, at least one prediction image portion corresponding to the image portion to be predicted, wherein the intra prediction process is in accordance with one of a plurality of intra prediction modes; and
   applying a parametric displacement transformation to the prediction image portion, wherein the parametric displacement transformation is one of a plurality of types and the type of the parametric displacement transformation is determined by the intra prediction mode of the intra prediction associated with the prediction image portion,
   wherein in a first case in which the intra prediction mode is angular then the type of the parametric displacement transformation is 1D displacement; and in a second case in which the intra prediction mode is non-angular then the type of the parametric displacement transformation is a 2D displacement.

2. The method according to claim 1 wherein the type of the parametric displacement transformation is a 1D displacement defined by one parameter.

3. The method according to claim 1 wherein the type of the parametric displacement transformation is a 2D displacement defined by two parameters.

4. The method according to claim 1 wherein the parametric displacement transformation comprises an affine displacement.

5. The method according to claim 1 wherein parameters of the parametric displacement transformation are non-integers and the parametric displacement transformation further comprises an interpolation process that is the same interpolation process used for a motion compensation process that is used for encoding or decoding the image.

6. The method according to claim 1 wherein one or more parameters of the parametric displacement transformation are not constant over the entire prediction image portion.

7. The method according to claim 1 wherein parameters of the parametric displacement transformation are not transmitted to the decoder and the decoder infers the parameters from predication samples of surrounding portions.

8. A device for predicting of an image portion, for encoding or decoding of the image, the image portion being predicted by an intra prediction process with respect to samples of at least one reference image portion of the image, the device comprising a central processing unit configured to:

generate reference samples from the samples surrounding the image portion to be predicted;

generate, from the reference samples, by the intra prediction process, at least one prediction image portion corresponding to the image portion to be predicted, wherein the intra prediction process is in accordance with one of a plurality of intra prediction modes; and apply a parametric displacement transformation to the prediction image portion, wherein the parametric displacement transformation is one of a plurality of types and the type of the parametric displacement transformation is determined by the intra prediction mode of the intra prediction associated with the prediction image portion, wherein the central processing unit is operable to determine in a first case in which the intra prediction mode is angular then the type of the parametric displacement transformation is 1D displacement; and in a second case in which the intra prediction mode is non-angular then the type of the parametric displacement transformation is a 2D displacement.

9. A non-transitory computer-readable storage medium storing instructions of a computer program for implementing a method of predicting of an image portion, for encoding or decoding the image, the image portion being predicted by an intra prediction process with respect to samples of at least one reference image portion of the image, the method comprising:

generating reference samples from the samples surrounding the image portion to be predicted;

generating, from the reference samples, by the intra prediction process, at least one prediction image portion corresponding to the image portion to be predicted, wherein the intra prediction process is in accordance with one of a plurality of intra prediction modes; and applying a parametric displacement transformation to the prediction image portion, wherein the parametric displacement transformation is one of a plurality of types and the type of the parametric displacement transformation is determined by the intra prediction mode of the intra prediction associated with the prediction image portion, wherein in a first case in which the intra prediction mode is angular then the type of the parametric displacement transformation is 1D displacement and in a second case in which the intra prediction mode is non-angular then the type of the parametric displacement transformation is a 2D displacement.

* * * * *